(12) United States Patent
Salazar et al.

(10) Patent No.: US 9,979,819 B2
(45) Date of Patent: *May 22, 2018

(54) UNIFIED CALL ROUTING IN SOCIAL HUNT GROUPS

(71) Applicant: International Business Machines Corporation, Armonk, NY (US)

(72) Inventors: Fernando Salazar, Arlington, MA (US); Bhavuk Srivastava, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/474,011

(22) Filed: Mar. 30, 2017

(65) Prior Publication Data

US 2017/0208174 A1    Jul. 20, 2017

Related U.S. Application Data

(63) Continuation of application No. 14/606,132, filed on Jan. 27, 2015, now Pat. No. 9,686,405, which is a continuation of application No. 14/191,601, filed on Feb. 27, 2014, now Pat. No. 9,667,783.

(51) Int. Cl.
| H04M 3/46 | (2006.01) |
|---|---|
| H04L 12/58 | (2006.01) |
| H04Q 3/68 | (2006.01) |
| H04M 3/42 | (2006.01) |

(52) U.S. Cl.
CPC .......... *H04M 3/465* (2013.01); *H04L 51/04* (2013.01); *H04L 51/32* (2013.01); *H04M 3/42374* (2013.01); *H04Q 3/68* (2013.01); *H04Q 2213/13072* (2013.01)

(58) Field of Classification Search
CPC .......... H04M 3/523; H04M 3/465; H04Q 2213/13141; H04Q 3/64; H04Q 2213/141
USPC ............... 379/265.11, 265.12, 211.03
See application file for complete search history.

(56) References Cited

U.S. PATENT DOCUMENTS

| 6,404,885 | B1 | 6/2002 | Field et al. |
|---|---|---|---|
| 7,321,298 | B2 | 1/2008 | Judkins et al. |
| 7,738,650 | B2 | 6/2010 | Balk et al. |
| 7,907,718 | B2 | 3/2011 | Sin et al. |
| 2004/0248590 | A1 | 12/2004 | Chan et al. |
| 2005/0238157 | A1 | 10/2005 | Shaffer et al. |
| 2006/0252444 | A1 | 11/2006 | Ozugur |

(Continued)

FOREIGN PATENT DOCUMENTS

| EP | 1035739 A2 | 9/2000 |
|---|---|---|
| WO | 1997016014 A2 | 5/1997 |

OTHER PUBLICATIONS

Faulkner, Adam, "The top 10 call routing strategies", Jul. 23, 2008, <http://www.callcentrehelper.com/the-top-10-call-routing-strategies-1814.htm>.

(Continued)

*Primary Examiner* — Antim G Shah
(74) *Attorney, Agent, or Firm* — Stephen R. Yoder

(57) ABSTRACT

Telephone call routing in a hunt group is based upon monitoring computer activities of the members (devices, people) of the hunt group. For example, a hunt group's member activity score may be based upon how many incoming hunt group calls that member handles. This high activity score is then used to control that member's place in the call routing order.

20 Claims, 8 Drawing Sheets

(56) References Cited

U.S. PATENT DOCUMENTS

| | | |
|---|---|---|
| 2011/0320534 A1 | 12/2011 | Wallace et al. |
| 2012/0101865 A1 | 4/2012 | Zhakov |
| 2015/0244862 A1 | 8/2015 | Salazar et al. |
| 2015/0244864 A1 | 8/2015 | Salazar et al. |

OTHER PUBLICATIONS

"Hunt List Configuration", Cisco Unified Communications Manager Administration Guide, Release 7.1(2), provided in search report dated Aug. 28, 2013, <http://www.cisco.com/en/US/docs/voice_ip_comm/cucm/admin/7_1_2/ccmcfg/b03htlst.html#wp1021502>.

700a

MEMBER RANKING

WEEK 12, DAY 1

| RANK | MEMBER NAME | MEMBER DEVICE | ACTIVITY SCORE |
|---|---|---|---|
| 1 | BAKER | CONFERENCE ROOM | 21 |
| 2 | CHARLIE | LAPTOP | 17 |
| 3 | DAVID | COMPUTER | 9 |
| 4 | ELIZABETH | SMART PHONE | 8 |

FIG. 4A

MEMBER RANKING
WEEK 13, DAY 1

700b

| RANK | MEMBER NAME | MEMBER DEVICE | ACTIVITY SCORE, DEVICE |
|---|---|---|---|
| 1 | CHARLIE | LAPTOP | 19 |
| 2 | BAKER | CONFERENCE ROOM | 16 |
| 3 | ELIZABETH | SMART PHONE | 11 |
| 4 | DAVID | COMPUTER | 9 |

FIG. 4B

UNIFIED CALL ROUTING IN SOCIAL HUNT GROUPS

FIELD OF THE INVENTION

The present invention relates generally to telephone call routing in a hunt group and more particularly to the rules that control telephone call routing in a hunt group.

BACKGROUND OF THE INVENTION

Rapid communications have become a critical business requirement for organizations seeking to take fast action as business opportunities arise. Generally, business groups employ different forms of statically defined lists (for example, an organization may publish lists of contacts who have responsibilities for a given customer or technical area). Another approach is to define attributes for people within the organization directory, such as skill attributes or customer-name attributes. By searching the directory, the organization's personnel find people with the desired skill or affinity.

In telephony, a hunt group involves the method of distributing phone calls from a single telephone number to a group of several phone lines. Organizations may employ a private branch exchange (PBX) to form hunt groups having a virtual phone number configured to connect to one of a set of direct phone numbers based on a desired formula or scheme (for example, a hunt group may be configured to ring the first non-busy number of a certain set of numbers). In applications such as call centers, hunt groups may be configured to make connections based on the calling user's customer record. Hunt groups provide convenience, in that they allow someone to call a single number for "computer help" or "purchasing" and not be concerned with exactly who they are calling.

SUMMARY

A method for routing calls within a hunt group including a plurality of group members, the method including: monitoring, for a period of time, responses to customers of at least a first member and a second member of a plurality of members of a hunt group to obtain, for the period, a first monitoring result corresponding to the first member and a second monitoring result corresponding to the second member, wherein the first monitoring result includes a first count of responses corresponding to the first member, and wherein the second monitoring result includes a second count of responses corresponding to the second member; establishing a ranking between the first member and the second member based, at least in part, on the first count of responses and the second count of responses; establishing a call routing order for routing an incoming call to the plurality of members based, at least in part, on the ranking between the first member and the second member; and monitoring for the period, posts submitted by the first member and the second member. The first monitoring result further includes a first number of posts to a particular blog by the first member. The second monitoring result further includes a second number of posts to the particular blog by the second member. The ranking is further based at least in part on the first number of posts and the second number of posts during the period.

BRIEF DESCRIPTION OF THE SEVERAL VIEWS OF THE DRAWINGS

FIG. 4A is a first screenshot generated by the first embodiment computers system;

FIG. 4B is a second screenshot generated by the first embodiment computers system;

DETAILED DESCRIPTION

Figure 1:
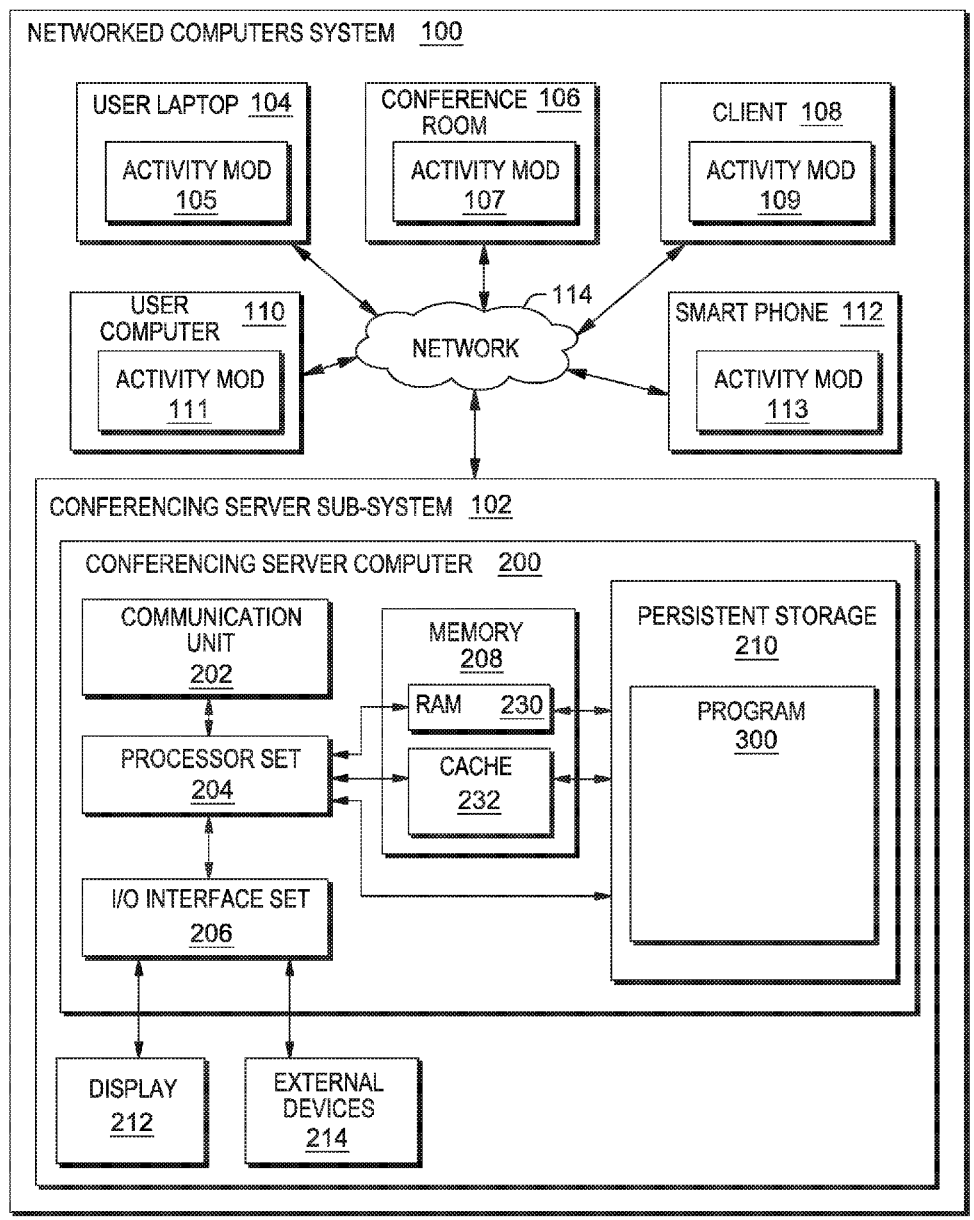
FIG. 1 is a schematic view of a first embodiment of a networked computers system according to the present invention.

Telephone call routing in a hunt group is based upon monitoring computing activities of the members (devices, people) of the hunt group. For example, a hunt group's member activity score may be based upon how many incoming hunt group calls that member handles. A high activity score, based on the results of activity monitoring, is then used to control that member's place in the call routing order. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of a networked computers system 100, including: conferencing server sub-system 102; user laptop sub-system 104; activity module 105; conference room sub-system 106; activity module 107; client sub-system 108; activity module 109; user computer sub-system 110; activity module 111; smart phone sub-system 112; activity module 113; communication network 114; conferencing server computer 200; communication unit 202; processor set 204; input/output (i/o) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
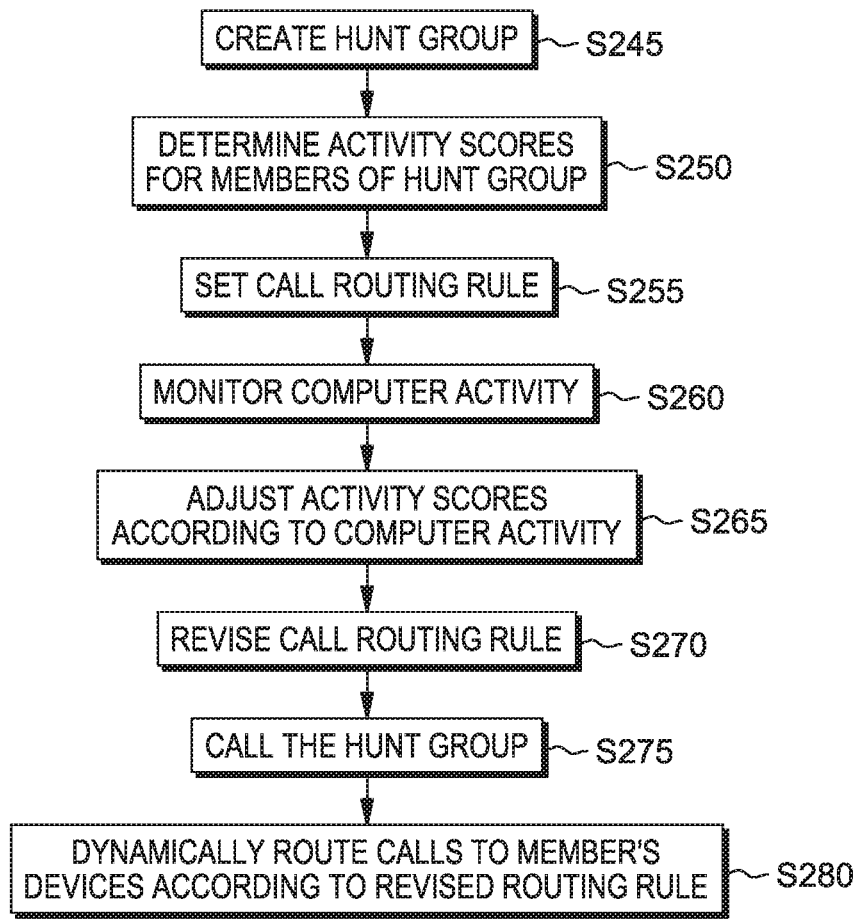
FIG. 2 is a flowchart showing a process performed, at least in part, by the first embodiment computers system.
Figure 3:
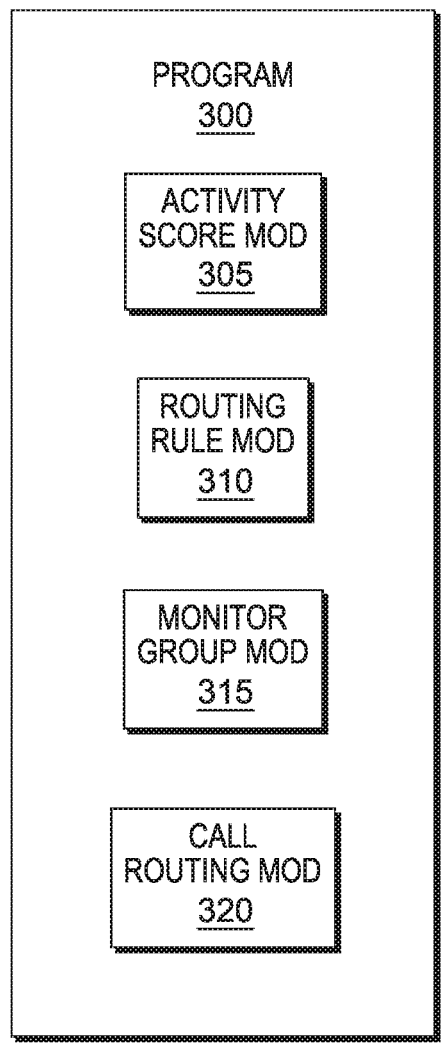
FIG. 3 is a schematic view of a portion of the first embodiment computers system.

FIG. 2 shows flow chart 240 depicting a method according to the present invention. FIG. 3 shows program 300 for performing at least some of the method steps of flow chart 240. This method and associated software will now be discussed, over the course of the following paragraphs, with extensive reference to FIG. 2 (for the method step blocks) and FIG. 3 (for the software blocks).

Processing begins at step S245, where a hunt group is created. In this embodiment, the hunt group is a socially formed group of users related by a common interest in a celebrity named, Able. This hunt group is referred to herein as the Able fan club, or fan club. The fan club is socially formed in that membership to the group requires joining the Able fan club website by obtaining a user login and password and providing contact information. The Able fan club is associated with universal contact information, that is, there is a single e-mail address, instant messaging ID, and phone number to be used for contacting the Able fan club for information about Able, including: the latest gossip about Able, recent places where Able has been seen, autograph sessions, and/or the status of projects that Able is working on.

There is a member's only blog that allows the various members to post discussions and/or photos related to Able. Further, the Able fan club is headquartered at Baker's home, where he maintains a fan club conference room and a dedicated computer for use by members of the club. As a member of the hunt group, an activity monitor is loaded onto one or more member devices as directed by the member. As shown in FIG. 1, activity modules 105, 107, 109, 111, and 113 are loaded on various devices including Baker's conference room 106 and Baker's dedicated computer, client sub-system 108. The activity modules track member activity including: (i) chat sessions; (ii) phone calls; (iii) website activity; and/or (iv) blog posts.

It should be noted that the disclosed method and associated software may be used with alternatively formed groups, with or without an internet presence, so long as the group is contacted by users in a unified manner so that the contact is made through a routing scheme as described herein.

Processing proceeds to step S250, where activity score module 305 determines the activity score for each of the hunt club members. The activity score is used to rank the members of the hunt group regardless of the number of devices reporting. In this embodiment, the activity score of each member is based exclusively on the computing activity on the device designated by the member. Alternatively, each device is ranked according to related computing activity regardless of common ownership by a single member. Alternatively, each member is ranked by the combined related activity on each of the members' devices.

Processing proceeds to step S255, where routing rule module 310 sets the call routing rule. In this embodiment, the call routing rule is based exclusively on the activity score of the device designated by each member. FIG. 4A is screenshot 700a showing a chart of the ranking for each member of the Able fan club on the first day of week 12. In this example, the call routing rule directs contacts to Baker at the Able fan club headquarters because his activity score, based on his conference room activity, is 21. This activity score is higher than any other member. As further shown in screenshot 700a: (i) Charlie is ranked second, with an activity score of 17; (ii) David is ranked third, with an activity score of 9; and (iii) Elizabeth is ranked fourth, with an activity score of 8. While this embodiment is rather simple, it is intended to present the disclosed invention in an easily understood form. More complex examples and further embodiments are discussed below, in the Further Comments and/or Embodiments Section of this Detailed Description.

Processing proceeds to step S260, where monitor group module 315 tracks, or monitors, the related activity of each member of the hunt group. Each activity module, including modules 105, 107, 109, 111, and 113, periodically reports computing activity data to activity score module 305. The reported computing activity is one example of "monitoring results" that influence a member's position in the call routing order. Computing activity data is any data that accounts for hunt group activity on a particular device. This accounting may include, but is not limited to: (i) the number of phone calls received through the unified call-in number; (ii) the number of fan club blog posts submitted from a device; (iii) the number of instant messaging sessions hosted by a device; (iv) the number of blog post comments submitted by a device; (v) the duration of phone calls received through the unified call-in number; (vi) the duration of instant messaging sessions hosted by a device; and/or (vii) the length of blog posts submitted from a device.

In this embodiment, the monitor group module receives daily monitoring results in the form of activity data updates from the Able fan club's activity modules loaded onto each of the members' devices. In alternative embodiments, activity data is collected hourly, weekly, and/or monthly. Continuing with the above example, during week 12, Baker is unable to receive calls or access the internet from conference room sub-system 106. Also, during week 12, Elizabeth meets Able in person and posts an account of this encounter on the fan club website. Elizabeth's post is well received and led to several additional posts describing the meeting in more detail.

Processing proceeds to step S265, where activity score module 305 adjusts the activity scores of each member of the hunt group. In this embodiment, the activity scores are adjusted each time the daily activity data is received by monitor group module 315. In alternative embodiments, the activity scores are adjusted periodically and/or on-demand by a managing entity, such as the user who created the hunt group.

FIG. 4B is screenshot 700b showing a chart of the ranking for each member of the Able fan club on the first day of week 13. To continue with the above example, Baker's inactivity during week 12 is reflected in a reduced activity score of 16, down from 21 the week before. Elizabeth's additional activity during week 12 is reflected in her increased activity score of 11, up from 8 the week before. With a score of 11, Elizabeth is ranked third, ahead of David, who was ranked third the week before. In Baker's absence, contacts were routed to Charlie according to the routing rule established in step S255. Charlie ranked second behind Baker during week 12. Because Charlie was able to handle many of these calls, his activity score increased to 19, up from 17 the week before.

Processing proceeds to step S270, where routing rule module 310 revises the routing rule according to the latest member ranking. In this embodiment, the routing rule is set according to the rank of each member as shown in FIG. 4B. Alternatively, additional data is considered when setting the routing rule for the members of a given hunt group, such as: (i) maturity; (ii) seniority; and/or (iii) desire to be contacted.

Processing proceeds to step S275, where call routing module 320 receives a call made to the hunt group's unified call-in number. Incoming calls are received from the unified call-in number and then transferred to a specified member contact number. Not only are calls routed, but instant messages and e-mail are routed according to availability of member devices and corresponding member and/or device rank.

Processing proceeds to step S280, where call routing module 320 routes the call to the first ranked member of the fan club. According to the way in which the call is handled by the member, the activity module loaded onto the member's device stores the corresponding activity data for transmission to monitor group module 315. If the call is unanswered, call routing module 320 routes the call to the second ranked member of the fan club. Any resulting activity by the second ranked member is stored as activity data for transmission to the monitor mod. The call is routed according to the rank of the members until the call is completed.

III. Further Comments and/or Embodiments

Some embodiments of the present invention recognize the following facts, potential problems and/or potential areas for improvement with respect to the current state of the art: (i) while the infrastructure to enable rich real time communications (voice and video) typically is in place, there are often difficulties in determining who to communicate with; (ii) this is especially true for organizations with global reach, where individuals with needed skills and/or information may be located anywhere across the globe or in any segment of the larger organization; (iii) current approaches to this problem suffer from the overhead of managing static data (for example, lists of account responsibilities must be kept up to date, and user directory properties must be maintained by users); (iv) more often than not this information is not maintained, leading to unproductive communications (for example, where using such a static list to locate a representative for a specific account only to find that person is no longer involved); (v) hunt groups suffer from the problems outlined above (that is, where static lists must be constantly maintained in order to remain useful); and/or (vi) while communications technologies and infrastructure have reached the point where high-grade communications can be easily deployed and used, most organizations still use manual and error-prone means for determining who to communicate with on any given issue.

Some embodiments of the present invention may include one, or more, of the following features, characteristics and/or advantages: (i) a social hunt group (SHG) is created; (ii) formulating a social hunt group where incoming calls to the hunt group are routed to individual members of the hunt group; (iii) address the shortfalls of statically defined communications lists by providing a dynamic means of determining such lists; (iv) leverage an organization's social computing infrastructure and data; (v) SHGs are automatically aligned with the groupings that a user expects in other contexts; (vi) allow a caller/user to reach a person with a desired skill or affinity; (vii) skill or affinity of the contact determined by the social computing activities of a pool of contacts in the overall organization; (viii) a socially formed hunt group where a person reaches out in the form of calling the group or a Unified SHG number; (iv) a method to define the "Active End Point" (AEP) in a group, where the AEP is either a person or a device; (x) a social hunt group defined by AEPs including: (a) people, (b) devices, (c) conference numbers, and/or (d) interactive voice response (IVR) services; (xi) the AEP is a person who is an active member of the SHG; (xii) a method to define any other active object, such as a conference room number, a number of another SHG, a device, a number to an IVR service, etc.; (xiii) automatic and dynamic routing of calls within the SHG; (xiv) automatic dynamic routing of incoming calls to the social hunt group based on a social score of the individual members of the group; (xv) automatic dynamic routing of incoming calls to the social hunt group based on a social score of the devices used by members of the group; (xvi) the call made to the SHG group ends up on the conferencing application server (CAS) that routes the call to an AEP; (xvii) the dynamic routing rule is changed based on the AEP's activity in a group; (xviii) automatically updates the social score; (xix) computing the social score of members of the group based on daily activities; (xx) generating a social score based on a plurality of services at the back-end (for example, responses to calls, responses in an activity, the skill of members, posting to blogs, and posting to forums); and/or (xxi) the social score is maintained to create the priority of the routing rule.

Some embodiments of the present invention may include one, or more, of the following features, characteristics and/or advantages: (i) automatic conversion of a call into a conference of having multiple active points being invited; (ii) the active member score is defined either in terms or responding to the calls or messages, or an active participation in a forum; (iii) provide the SHG with moderation techniques so that the routing rules can be modified and/or changed; (iv) a social hunt group managed by an administrator as an extension to dynamic updates; (v) provide a mechanism to reach out to social networking groups with not just the routing of calls but also routing of instant messages that can reach out to any person in the group to resolve any query that the person is looking for; (vi) provide the extension to integrate with the IVR system as not only an AEP, but also as the mechanism to define the routing rule, depending on the caller's requirement; (vii) in addition to the social score and properties that dynamically define the routing rule, the caller may also set the priority to define such that the call is routed to the AEP's accordingly; (viii) use a real time social score to generate a real time dynamic rule to reach out to an AEP, or other contact, in real time; (ix) extends the existing system under test (SUT) functionality to place the call, not just based on the user's unified number and using the preferred devices in a routing rule to a much more advanced and intelligent routing of call; (x) provide the unified routing to the group level with dynamic routing facility; and/or (xi) provide the social networking integration to provide the real dynamic routing instead of being based on the static numbers.

Some embodiments of the present invention may include one, or more, of the following features, characteristics and/or advantages: (i) applies to corporate connections communities allowing an employee to reach out to any of the members of a given community; (ii) provides both real time communication and just-in-time information availability based on the caller's requirement (for example, if a caller is in need of an answer for a customer while talking to the customer, he can just simply call the SHG unified number and gets his answers from any one of the AEP receivers); (iii) provides a mechanism to reach out to enterprise special groups or forums such as sales team, services team, etc. based on the desired skill sets and/or customer interactions; (iv) provide a mechanism to reach out to social networking groups with more than just the routing of calls, but also instant messages that can reach out to any person in the group to resolve any appropriate query that the person may have; (v) does not require any additional hardware, so the cost to implement is low; and/or (vi) leverage the existing access control infrastructure for a simple and easy implementation.

One example embodiment illustrating the dynamic routing rule based on a social score involves a group named "Messaging." Messaging group is defined with a set of properties for a routing rule, including: (i) users role; (ii) user's component ownership; (iii) users skills; (iv) users interaction with forums and blogs; and (v) users responses to the SHG service. The routing rule is formed based on the above set of properties as follows:

Unified Call-In Number→001-777-654-3210
Users
Able—Routing Score 10→001-777-654-1111
Baker—Routing Score 8→001-777-654-2222
Charlie—Routing Score 5→001-777-654-3333

In this example, when a Level Two support member gets a call from the customer and the customer is blocked with an issue in production deployment, the Level Two support gets the details of the problem and wants to reach out to the backend developer to get to a quick response to the customer. Accordingly, the Level Two support member makes the call to Messaging group. When the call reaches the SHG service, the service picks up the routing rule that is currently defined (or updated) and presents the list to the telephony application server (TAS) to start making the call. The call is first routed to Able, then to Baker, and finally to Charlie, until one of the target members of the SHG picks up the call. In that way, the call reaches one person in the SHG that can help. In this example, Baker picks up the phone and responds to the query. By answering the phone, Baker gets a bonus in his routing score. Baker's score increases from 8.0 to 9.5. This example illustrates one way that the routing score is dynamic and the corresponding routing rule can change over time as the routing scores are adjusted.

Another example embodiment is presented to illustrate the advanced routing rule with an IVR extension. In the above example, two processes were: (i) how the call from the Level Two support member to Messaging group is routed through each group member; and (ii) how the routing rule and routing score is dynamically advanced so that the contact list is always based on the current nature and performance of the various SHG members. In this example, an extension is provided with the IVR service, so that the routing can be better optimized. In a scenario where a sales person is in the customer's office and is about to lose out on a highly critical fourth quarter deal because the customer is in the comparison mode, that is, looking feature by feature at the video capability of Messaging System I with an add-on Video Service and the sales person does not have answers to each of the questions that the customer is asking. Building the SHG service with an IVR extension helps in getting real time answers for the sales person. To get the needed answers, the sales person calls the unified group number for Messaging group. The IVR service comes into play as the IVR is pre-loaded with the questions on the routing rule properties including: (i) product version; (ii) product component; (iii) developer; and (iv) product management. The sales person gets the request and selects the option. In this example, the routing rule is calculated with an intelligent mix of the SHG members based on: (i) skills; (ii) responses; and (iii) social score. Accordingly, Able, a member of product management, is first, with a score of 7, phone number 1-777-888-1111. Baker, an architect, is second, with a score of 8, phone number 1-777-666-2222. Charlie, a developer, with a score of 6, phone number 1-777-555-3333. The call is made in the specified order and the right responses are gathered by the sales person to win the customer's business.

Yet another example is presented to illustrate SHG Conferencing. In the above two examples, it is shown how the various dynamic routing rules can be created and also how the IVR extension provides real time support. In this example, it will be shown how some embodiments of the present invention can be used to leverage conferencing capability when the caller is going through the routing process. Continuing with the second example, where the sales person reached out to Able, in product management; however, product management does not have the visibility of some technical details. The SHG service provides the option to place the Able/sales person line on hold and route the call to a selected technical person. An architect, the technical person, answers the call, which is then merged with the Able/sales person line to make it a conferencing. In this way, the product management contact, the technical contact, and the sales person are each involved in the call to achieve the best result for the customer.

Yet another example is presented to illustrate the corporate connections community integration into an SHG. Another direct use of the SHG is to have the unified number associated with a corporate connections community. Each community member registered in a given community is part of the corresponding SHG. The routing rule is dynamically adjusted, created, and/or modified according to the community interactions and the way each member is participating in the community, that is, how active the member is in the community. In this example, the social score of the member is based on: (i) how many calls the member has taken; (ii) how many wiki pages and/or postings the member owns in the community; (iii) how many activities the member has participated in with the community; and (iv) the relevant skills score for the member. For example, a community called "Messaging System I AV Development" where the members are participating in architecture discussions may be a good resource for product management (or any executive) when having an meeting with a customer where a response is needed regarding what is coming in Messaging System I AV with some specifics about the feature. Typically, product management will send an email seeking needed answers. However, in the SHG integration product management makes a call to the Messaging System I AV's unified phone number and the routing rule calls the community members in the order of the social score, or routing score, as mentioned above. In this way, an answer will be obtained immediately.

Figure 5:
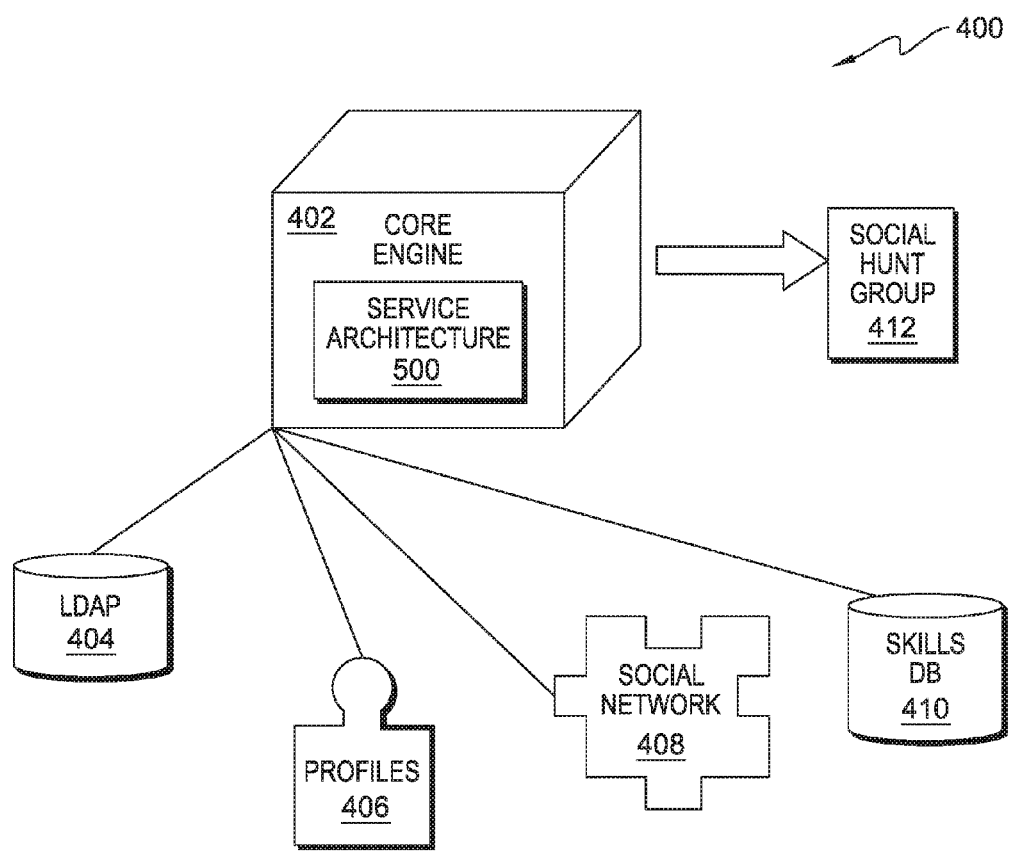
FIG. 5 is a schematic view of a second embodiment of a networked computers system according to the present invention.

FIG. 5 is a schematic view of computer system 400 including a main controller, or core engine, according to the present disclosure. The computer system includes: social hunt group core engine 402; service architecture 500; lightweight directory access protocol (LDAP) 404; profiles database 406; social network application 408; skills database 410; and social hunt group 412.

Computer system 400 provides social hunt group management, or SHG service. The social hunt group core engine provides one, or more, of the following services: (i) maintains an SHG that is controlled by the owner (or moderator, or administrator); and/or (ii) automatically "learns" based on the input services that interact with the SHG, such as the LDAP and the social network application. As any of the input services change, core engine 402 applies the new information to compute a social score for the corresponding member of the hunt group.

Computer system 400 includes the following features, characteristics and/or advantages: (i) provides an owner-based SHG with group creation tools; (ii) provides an owner-based SHG with group management tools; (iii) provides an SHG management interface that can be extended to query/search a member's social score by: (a) input services, (b) back-end, and/or (c) third party services; and (iv) provides an SHG management interface that can be extended by an integrated IVR service that provides: (a) input to the SHG service, and (b) controls the SHG priority based on a user's request.

Core engine 402 is the main controller for the SHG service provided by computer system 400. The main controller maintains the priority order of the SHG. The priority order is based on the above-mentioned set of input sources. The core engine routes the call to social hunt group 412 according to the priority order at the time a call is made to the unified social hunt group phone number.

Figure 6:
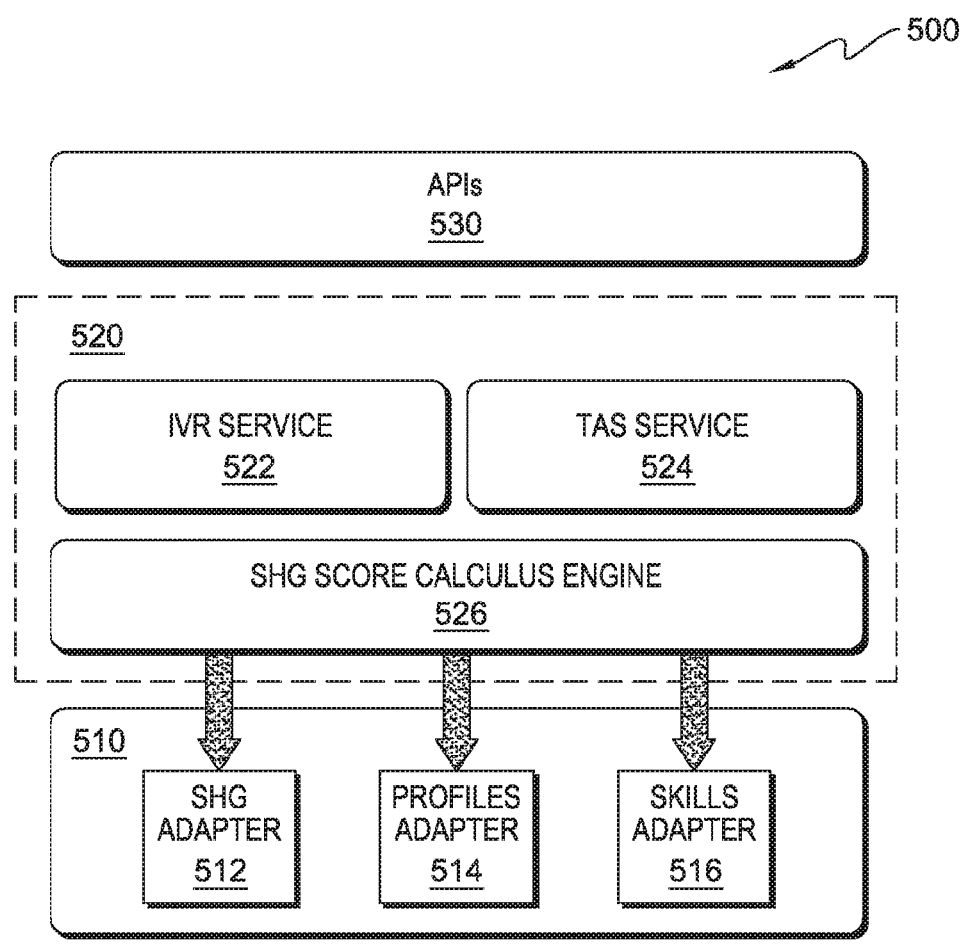
FIG. 6 is a schematic view of a portion of the second embodiment computers system.

FIG. 6 is a schematic view of social hunt group service architecture 500 according to an embodiment of the present disclosure. Architecture 500 includes: Adapter set 510; social hunt group adapter 512; profiles adapter 514; skills adapter 516; social hunt group service module 520; interactive voice response service 522; TAS service 524; social hunt group score calculus engine 526; and application programming interfaces 530.

The SHG service operates on the person-object and on how the person-object scores with respect to other person-objects within the hunt group in the various communication streams that are used including the service's own database. The architecture consists of an open and layered approach as shown in FIG. 6. The SHG service publishes some APIs 530 on which various adapters, such as SHG adapter 512, profiles adapter 514, and skills adapter 516, in adapter set 520 can be built. The job of each of the adapters is to interact with their corresponding back end source and retrieve the vital piece of information of a given person-object.

In this embodiment, local SHG adapter 512 keeps track of the person-objects interaction within the SHG communication scheme. Further, the SHG service also provides interfaces to IVR service 522 and TAS service 524 so that the input request can be processed.

Figure 7:
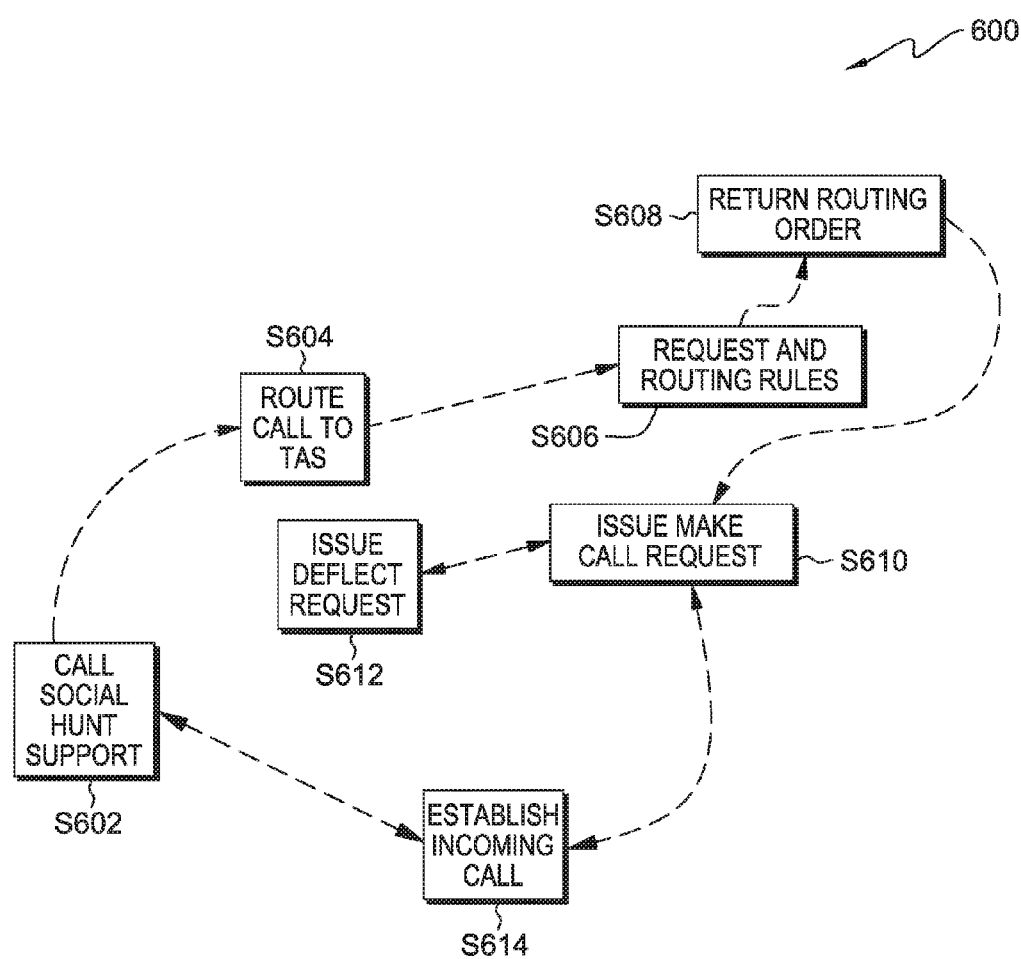
FIG. 7 is a flowchart showing a process performed, at least in part, by the second embodiment computers system.

FIG. 7 is flow chart 600 depicting a method of call routing and flow according to an embodiment of the present disclosure. This method and associated software will now be discussed, over the course of the following paragraphs.

Processing proceeds to step S602, where a user calls a social hunt group via the group's unified phone number.

Processing proceeds to step S604, where the call is routed to TAS service 524, which maintains the SHG unified number.

Processing proceeds to step S606, where TAS service 524 requests the SHG priority order and routing rules on the SHG service via SHG adapter 512.

Processing proceeds to step S608, where SHG adapter 512 responds to the TAS request with the priority routing order.

Processing proceeds to step S610, where TAS service 524 issues a "makecall" request to a telephony conferencing service (TCS) for the caller's offer and device. In this step, the TCS connects the caller's side of the call. At this time, the TCS determines if there is an IVR service option configured for the social hunt group service. If so, the TCS connects the received call to the first order number which is the number for the IVR service. When the IVR service is completed, or if there is no IVR service, the priority order list is returned to the TAS service from the SHG service via SHG adapter 512.

Processing proceeds to step S612, where TAS service 524 issues the deflect/divert call request to the TCS with the number in the preferred list provided by the SHG service. In this embodiment, the first request fails to establish the call, so a deflect request issues. Alternatively, a first request succeeds and the incoming call is established.

Processing proceeds to step S614, where the TCS sends the deflect/divert request to the corresponding number and the incoming call is established upon the response from that number. In this embodiment, an incoming call is established via an instant messaging client. Alternatively, communication is established via a corporate phone system, desk phone, and/or over a network through a telephony gateway. In this embodiment, a second request succeeds in establishing the incoming call. Alternatively, step S614 repeats until a response is made from the number selected from the preferred list.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber/member: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Computing activity: activity associated with a customer support function including communication by: (i) phone; (ii) instant messaging; (iii) blog posts; (iv) wiki page maintenance and/or ownership; and/or (v) email.

Telephone calls: includes calls made over any type of telephony communication network now known or to be developed in the future; "telephone calls" are not limited to calls made over POTS (plain old telephone system).

What is claimed is:

1. A computer-implemented method comprising:
determining a first call routing order for routing incoming calls to a first member of a hunt group and to a second member of a hunt group;
monitoring, for a period of time, responses to customers of the first member and the second member of the hunt group to obtain, for the period, a first monitoring result corresponding to the first member and a second monitoring result corresponding to the second member, wherein the first monitoring result includes a first count of responses corresponding to the first member, and wherein the second monitoring result includes a second count of responses corresponding to the second member;
establishing a ranking between the first member and the second member based, at least in part, on the first count of responses and the second count of responses;
revising the first call routing order to a second call routing order based, at least in part, on the ranking between the first member and the second member; and
monitoring for the period, posts submitted by the first member and the second member;
wherein:
the first monitoring result further includes a first number of posts to a particular blog by the first member;
the second monitoring result further includes a second number of posts to the particular blog by the second member; and
the ranking is further based at least in part on the first number of posts and the second number of posts during the period.

2. The computer-implemented method of claim 1 wherein the monitoring includes monitoring of all of the hunt group members including the first and the second member.

3. The computer-implemented method of claim 1 wherein the monitoring includes monitoring, for a member of the hunt group, activity consisting of:
responses to calls to the hunt group; and
responses to instant messages to the hunt group.

4. The computer-implemented method of claim 1 wherein each member of the hunt group is a device.

5. The computer-implemented method of claim 1 wherein each member of the hunt group is a person.

6. The computer-implemented method of claim 1, further comprising:
routing the incoming call to the first member based, at least in part, on the second call routing order.

7. The computer-implemented method of claim 1, wherein establishing a ranking includes:
assigning a member activity score to the first member based on the first monitoring result;
the first monitoring result being based on use of a first device by the first member.

8. The computer-implemented method of claim 1, further comprising:
revising the activity score for the first member to a revised activity score that includes computing activity data received since a last update of the first monitoring result.

9. A computer program product comprising a computer readable storage medium having stored thereon:
first program instructions programmed to determine a first call routing order for routing incoming calls to a first member of a hunt group and to a second member of a hunt group;
second program instructions programmed to monitor, for a period of time, responses to customers of the first member and the second member of the hunt group to obtain, for the period, a first monitoring result corresponding to the first member and a second monitoring result corresponding to the second member, wherein the first monitoring result includes a first count of responses corresponding to the first member, and wherein the second monitoring result includes a second count of responses corresponding to the second member;
third program instructions programmed to establish a ranking between the first member and the second member based, at least in part, on the first count of responses and the second count of responses;
fourth program instructions programmed to revise the first call routing order to a second call routing order based, at least in part, on the ranking between the first member and the second member; and
fifth program instructions programmed to monitor for the period, posts submitted by the first member and the second member;
wherein:
the first monitoring result further includes a first number of posts to a particular blog by the first member
the second monitoring result further includes a second number of posts to the particular blog by the second member; and
the ranking is further based at least in part on the first number of posts and the second number of posts during the period.

10. The computer program product of claim 9 wherein the monitoring includes monitoring of all of the hunt group members.

11. The computer program product of claim 9 wherein the monitoring includes monitoring, for a member of the hunt group, activity consisting of:
responses to calls to the hunt group; and
responses to instant messages to the hunt group.

12. The computer program product of claim 9 wherein each member of the hunt group is a device.

13. The computer program product of claim 9 wherein each member of the hunt group is a person.

14. A computer system comprising:
a processor set; and
a computer readable storage medium;
wherein:
the processor set is structured, located, connected and/or programmed to run program instructions stored on the computer readable storage medium; and
the program instructions include:
first program instructions programmed to determine a first call routing order for routing incoming calls to a first member of a hunt group and to a second member of a hunt group;
second program instructions programmed to monitor, for a period of time, responses to customers of the first member and the second member of the hunt group to obtain, for the period, a first monitoring result corresponding to the first member and a second monitoring result corresponding to the second member, wherein the first monitoring result includes a first count of responses corresponding to the first member, and wherein the second monitoring result includes a second count of responses corresponding to the second member;
third program instructions programmed to establish a ranking between the first member and the second member based, at least in part, on the first count of responses and the second count of responses;
fourth program instructions programmed to revise the first call routing order to a second call routing order based, at least in part, on the ranking between the first member and the second member; and
fifth instructions programmed to monitor for the period, posts submitted by the first member and the second member;
wherein:
the first monitoring result further includes a first number of posts to a particular blog by the first member
the second monitoring result further includes a second number of posts to the particular blog by the second member; and
the ranking is further based at least in part on the first number of posts and the second number of posts during the period.

15. The computer system of claim 14 wherein the monitoring includes monitoring of all of the hunt group members.

16. The computer system of claim 14 wherein the monitoring includes monitoring, for a member of the hunt group, activity consisting of:
responses to calls to the hunt group; and
responses to instant messages to the hunt group.

17. The computer system of claim 14 wherein each member of the hunt group is a device.

18. The computer system of claim 14 wherein each member of the hunt group is a person.

19. The computer system of claim 14, wherein the third program instructions programmed to establish a ranking includes:
program instructions programmed to assign a member activity score to the first member based on the first monitoring result; the first monitoring result being based on use of a first device by the first member.

20. The computer system of claim 14, wherein the program instructions further include:
sixth program instructions programmed to revise the activity score for the first member to a revised activity score that includes computing activity data received since a last update of the first monitoring result.

* * * * *